(12) United States Patent
Cazzulani et al.

(10) Patent No.: US 11,879,797 B2
(45) Date of Patent: Jan. 23, 2024

(54) BRAKING DEVICE POSITIONABLE ON TEST BENCHES OF CORRECT OPERATION OF INDUSTRIAL SCREWDRIVERS

(71) Applicant: ATLAS COPCO INDUSTRIAL TECHNIQUE AB, Stockholm (SE)

(72) Inventors: Gabriele Cazzulani, Meda (IT); Emanuele Riva, Talamona (IT); Francesco Braghin, Varese (IT); Gaetano Cascini, Florence (IT); Niccolo Becattini, Florence (IT); Massimiliano Cattaneo, Carate Brianza (IT); Alessandro Attilio Interdonato, Varedo (IT); Gianmaria Celico Fadini, Nova Milanese (IT)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 285 days.

(21) Appl. No.: 17/287,044

(22) PCT Filed: Dec. 13, 2019

(86) PCT No.: PCT/IB2019/060746
§ 371 (c)(1),
(2) Date: Apr. 20, 2021

(87) PCT Pub. No.: WO2020/128744
PCT Pub. Date: Jun. 25, 2020

(65) Prior Publication Data
US 2021/0318197 A1    Oct. 14, 2021

(30) Foreign Application Priority Data
Dec. 20, 2018 (IT) .................. 102018000020338

(51) Int. Cl.
*G01L 25/00* (2006.01)
*G01L 5/28* (2006.01)
(Continued)

(52) U.S. Cl.
CPC .............. *G01L 25/003* (2013.01); *G01L 5/28* (2013.01); *G01M 99/007* (2013.01); *F16D 55/225* (2013.01); *F16D 2121/28* (2013.01)

(58) Field of Classification Search
CPC ...... G01L 25/003; G01L 5/28; G01M 99/007; F16D 55/225; F16D 2121/28
(Continued)

(56) References Cited

U.S. PATENT DOCUMENTS 3,783,682 A * 1/1974 Lipari ................... B25B 23/142
                                                                    73/862.23
5,941,611 A   8/1999 Trzmiel et al.
(Continued)

FOREIGN PATENT DOCUMENTS

JP      2004-60746 A    2/2004
WO    WO 2016/103150 A1  6/2016

OTHER PUBLICATIONS

International Search Report dated Feb. 6, 2020 in PCT/IB2019/060746 filed Dec. 13, 2019.
(Continued)

*Primary Examiner* — Max H Noori
*Assistant Examiner* — Masoud H Noori
(74) *Attorney, Agent, or Firm* — Oblon, McClelland, Maier & Neustadt, L.L.P.

(57) ABSTRACT

Braking device inserted in a test bench (2) for checking the correct operation of industrial screwdrivers, wherein the braking simulates a tightening operation of such screwdriver, comprising a container body (1) on the top of which a coupling (11) protrudes, suitable for coupling with the (Continued)

head (3) of the screwdriver to be tested, said coupling (11) being connected, by means of a shaft (12), to a braking unit (13), an electronic torque and angle detector (14) of the shaft rotation (12). Such braking unit (13) comprises a plate (14), rotated by the screwdriver, which is braked by suitable friction surfaces (15) moved towards the plate by the movement of an actuator; the movement of such actuator is performed by means of at least one electronically controlled piezoelectric element (17).

7 Claims, 3 Drawing Sheets

(51) Int. Cl.
  *G01M 99/00* (2011.01)
  *F16D 55/225* (2006.01)
  *F16D 121/28* (2012.01)
(58) Field of Classification Search
  USPC .......................................................... 73/1.09
  See application file for complete search history.

(56) References Cited

U.S. PATENT DOCUMENTS

| | | | |
|---|---|---|---|
| 11,598,683 B2* | 3/2023 | Cattaneo | G01L 3/20 |
| 2003/0056605 A1 | 3/2003 | Chiapuzzi et al. | |
| 2007/0163357 A1* | 7/2007 | Nakazawa | H02P 7/29 73/761 |
| 2017/0348037 A1* | 12/2017 | Sexson | A61B 90/03 |
| 2017/0356821 A1* | 12/2017 | Sartori | G01L 25/003 |
| 2017/0363500 A1* | 12/2017 | Boccellato | G01N 3/22 |
| 2020/0130152 A1* | 4/2020 | Parlow | B25B 23/14 |
| 2021/0191357 A1* | 6/2021 | Jousset | B25B 23/14 |

OTHER PUBLICATIONS

Neelakantan, V., et al., "Model Predictive Control of a Two Stage Actuation System using Piezoelectric Actuators for Controllable Industrial and Automotive Brakes and Clutches", *Journal of Intelligent Material Systems and Structures*, vol. 19, No. 7, 2008, XP055619313, pp. 845-857.

* cited by examiner

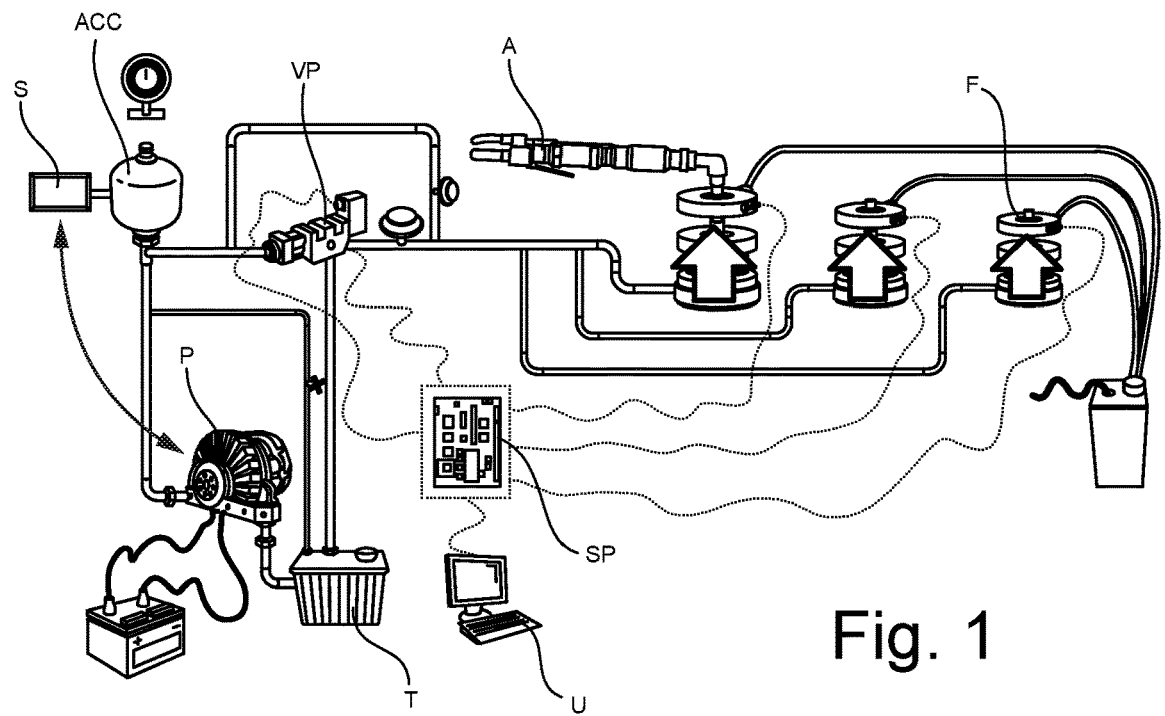
Fig. 1
Fig. 2
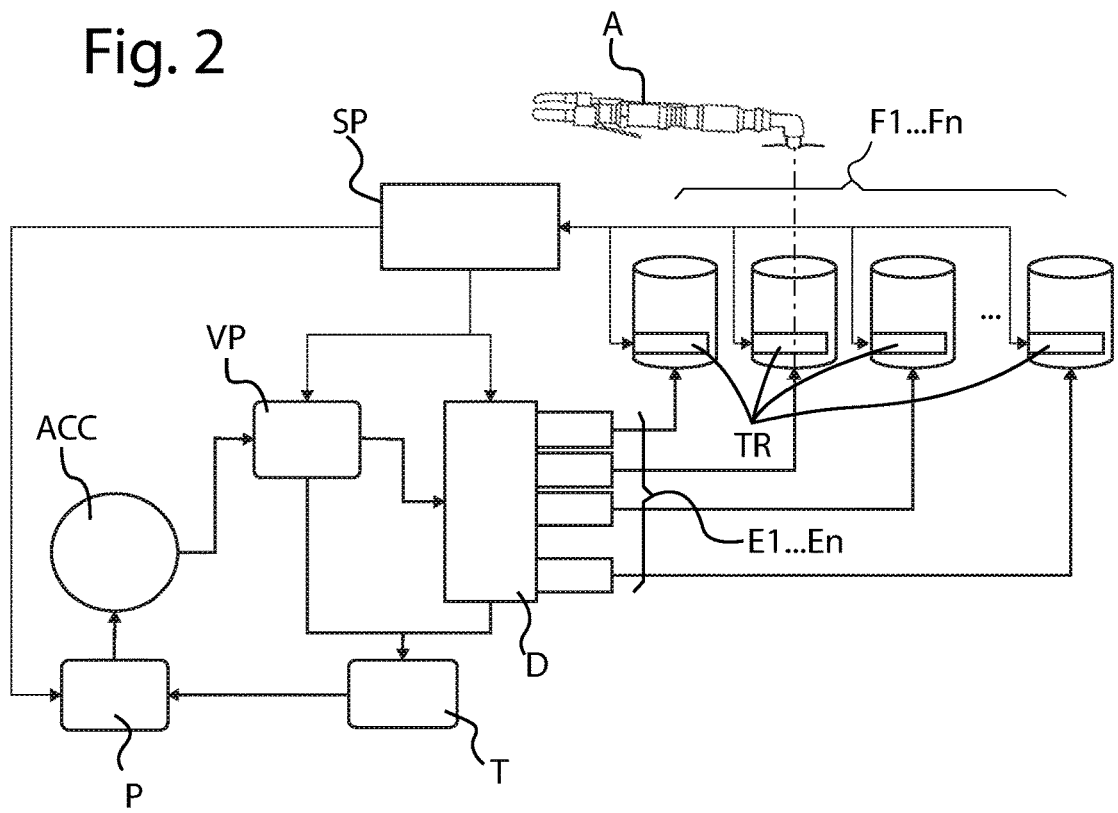

BRAKING DEVICE POSITIONABLE ON TEST BENCHES OF CORRECT OPERATION OF INDUSTRIAL SCREWDRIVERS

The present invention relates to braking devices inserted in a test bench on which the correct operation of industrial screwdrivers is verified. Such test takes place by associating the screwdriver with such braking device, on which the screwdriver applies a torque as though it were to tighten a conventional bolt or joint. The device provided with appropriate sensors measures the tightening quality of the screwdriver.

These screwdrivers are tested on test benches, such as the one shown in FIG. 1, described in the patent application WO2014203117 in the name of this same applicant, which comprise a plurality of hydraulic brakes F, with which the screwdrivers A are associated. These brakes are suitably controlled by a hydraulic circuit comprising at least one pump P, at least one pressure regulating valve VP that provides the pressurized fluid to all the brakes of the bench. Each brake is provided with external measuring transducers TR, connected to a computer U and which are driven by an appropriate program stored thereon. This electronic unit controls both the pump and the pressure regulating valve. The brakes of such known bench are all fed by the same hydraulic circuit, through a pressure regulating valve in common for all brakes.

A further test bench is described in FIG. 2 which comprises a plurality of hydraulic brakes F1-Fn, with which the screwdriver is associated, appropriately controlled by a hydraulic circuit comprising at least one pump P, which takes fluid from a tank T and supplies it to a pressure regulating valve VP, which in turn supplies it to the brakes.

Each brake is provided with measuring transducers TR, connected to an electronic driver board SP, which also controls such regulating valve VP.

The bench further comprises a computer U that communicates with such board and that comprises a suitable driving program stored thereon.

Once an operator has selected the brake to be used for testing the screwdriver, the driving program is able to progressively increase the braking capacity of the brakes by adjusting the pressure, until reaching a complete stop of the electronic screwdriver.

There is a hydraulic distributor D comprising the solenoid valves E1-En between such brakes and the regulating valve VP, which can select, activate and control the hydraulic pressure of each brake to which it is selectively connected.

The market of industrial screwdrivers is continuously evolving in order to meet the constantly more demanding requirements of the assembly industry. The increasing trend is to use constantly quicker tightening strategies to minimize the screwing cycle times. In this sense it is clear that it is important to be able to test tools that rotate at increasingly higher speeds.

One of the technological limits of the current joint simulation system is its frequency response, as the actuation system is a hydraulic actuation system. Hydraulic actuation is able to transfer large amounts of energy, but has the disadvantage of being slow. The restricted bandwidth can become even more invalidating when a control system is intended to be used. The bandwidth of a hydraulic system normally settles below 100 Hz. This limit is translated into a limitation of the minimum braking duration time and, therefore, the maximum rotation speed that can be tested for the screwdriver.

The solution proposed by the present invention to this problem of hydraulic brakes is that of using actuators of the piezoelectric type that have a much faster frequency response (in the order of 10 KHz).

Piezoelectric motors exploit the inverse piezoelectric effect by converting electrical energy (voltage and current) into mechanical energy (forces and movements). Actuators are strictly speaking devices that are monolithic in shape whereas motors are comprised of various parts.

An aspect of the present invention relates to a braking device having the characteristics of the appended claim 1.

The characteristics and advantages of the present invention will be clearer and evident from the following illustrative and non-limiting description of an embodiment, with reference to the attached figures which illustrate respectively:

FIG. 1 shows a first type of test bench for verifying industrial screwdrivers;

FIG. 2 shows a second type of test bench for verifying industrial screwdrivers;

Figure 4:
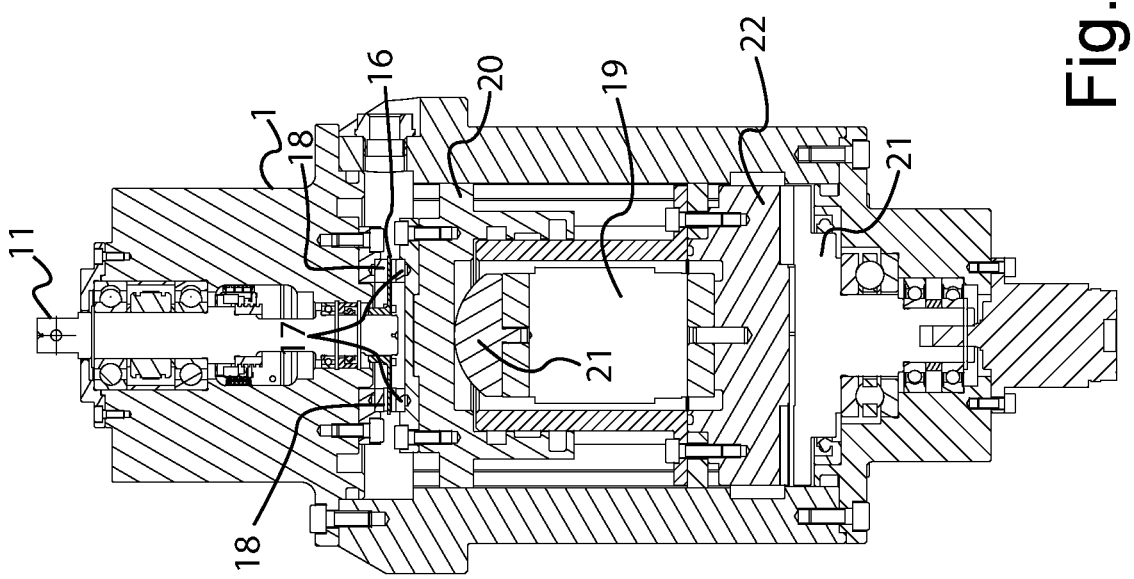
Figure 3:
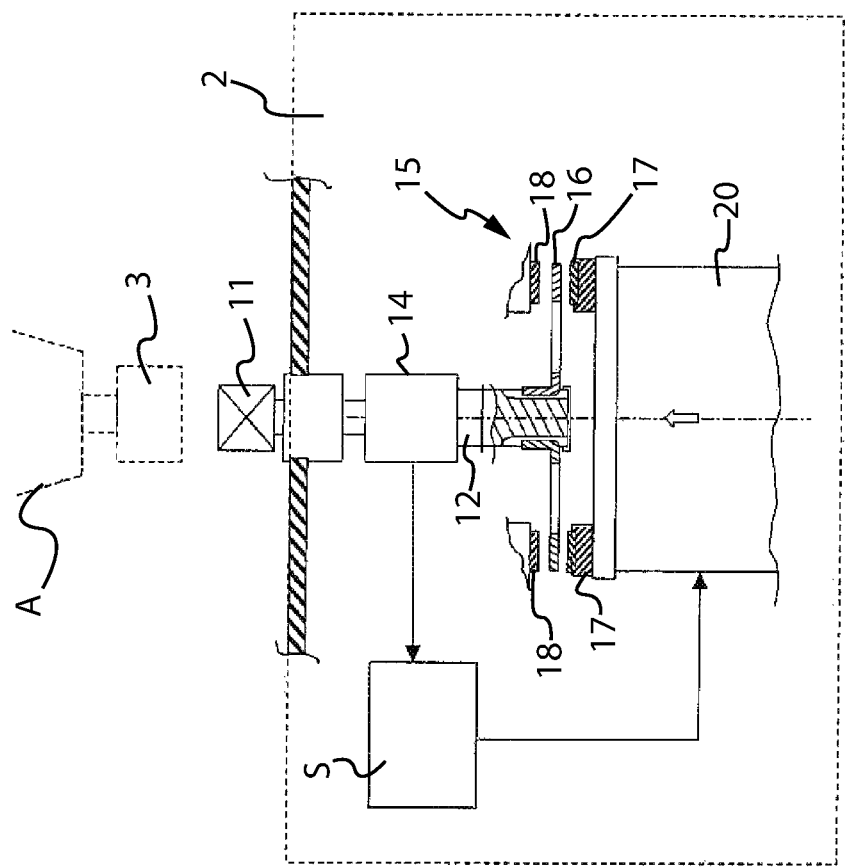
Figure 6:
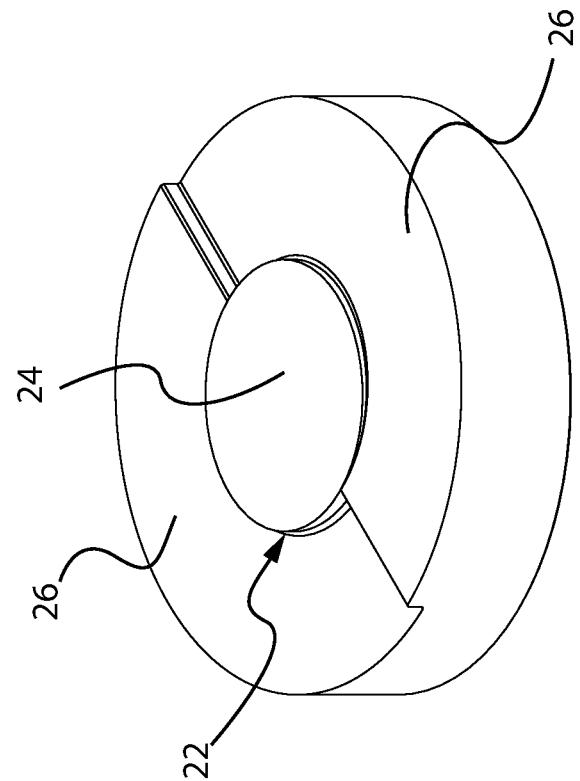
Figure 5:
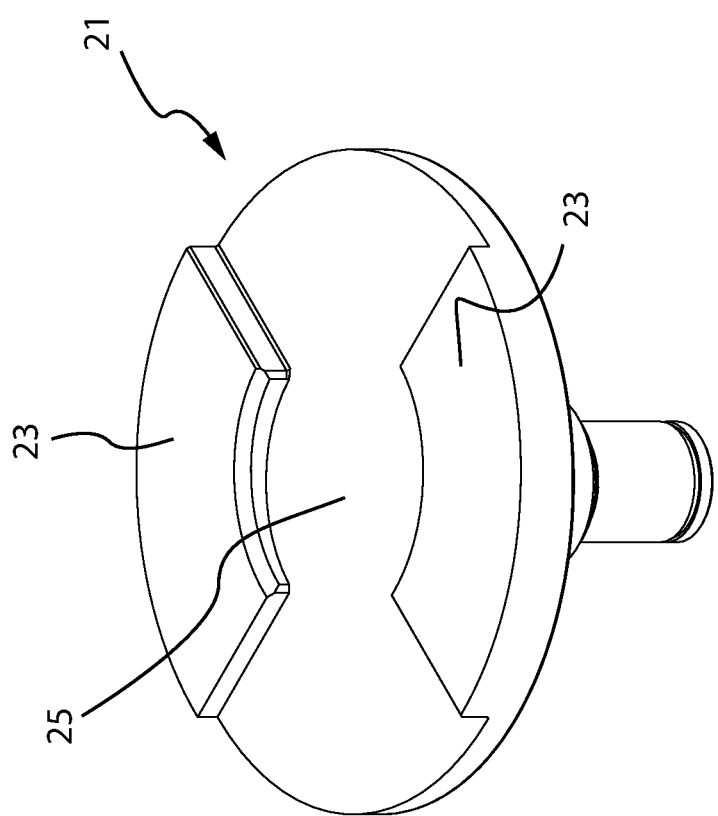

FIG. 3 presents a schematic view of the braking device according to the present invention;

FIG. 4 illustrates a sectional view of such braking device according to the present invention;

FIG. 5 illustrates a brake calibration plate;

FIG. 6 illustrates a rotating abutment calibration base for such plate of FIG. 5.

With reference to the mentioned figures the bench or verification system according to the present invention comprises a plurality of brakes with which the screwdriver is associated, appropriately controlled by an electronic control board from the bench which controls such brakes.

Each brake is provided with external measurement transducers, connected to the electronic board that determines the choice of a driver program, once the brake to be used for testing the screwdriver A has been chosen by the operator. Such program appropriately controls an actuator present in the brake which is able to modulate the braking capacity of the brakes.

A braking device according to the present invention is inserted in a test bench, generally indicated with reference number 2. From the surface of the bench the upper part of a preferably cylindrical container body 1 of the device protrudes and in particular a known coupling 11 protrudes, suitable for coupling with the head 3 of a screwdriver to be tested.

The coupling 11 is connected, by means of a shaft 12, to a braking unit 13 with the interposition of an electronic torque and angle detector 14 of the shaft 12 rotation.

The detector is controlled by the electronic board that controls the test bench of a screwdriver as a whole. Such electronic board S appropriately controls the braking unit 13 and detects, through the detector 14, the characteristics of the screwdriver for establishing the correspondence thereof with previously established test parameters.

Such measurements and verifications are known in themselves to a person skilled in the art and therefore shall not be further described or shown herein. The braking unit 15 comprises a plate 16, placed in rotation by the screwdriver, which is braked by appropriate friction surfaces 17 moved towards the plate by the movement of an actuator.

The actuator is preferably placed below the plate and pushes upwards the friction surfaces 15 on the lower surface of such plate. On the upper surface of the plate contrast surfaces 18 are provided, which cooperate with the friction surfaces to brake the plate.

The movement of said actuator is provided by at least one piezoelectric element 19.

Piezoelectricity is a natural characteristic of some crystals that produce an electric field if they are subjected to a mechanical action. The electric field in these crystals is the result of the deformation of the crystal lattice that constitutes them: the crystal is no longer electrically neutral, rather it is polarized. Such transformation is completely reversible.

Therefore, the appearance of an electric field due to a mechanical action takes the name of direct piezoelectric effect. There is also the opposite phenomenon, the action of an external electric field causes the deformation of the crystal (inverse piezoelectric effect). Because of these two principles both (direct effect) sensors and (inverse effect) actuators can be constructed.

In the present invention the piezoelectric element is placed in a housing and expands when stimulated by an electric current, raising a lifting plate 20 upwards which in turn pushes such friction surfaces. Such plate moves in guides placed on the internal surfaces of the container body 1.

The actuator preferably comprises a plurality of piezoelectric elements placed one on the other, so as to increase the total stroke of the actuator, adding up the effects of each element. Such type of actuator is known as a piezoelectric "stack".

Such stack is present as a cylinder that increases its height when stimulated by an appropriately driven electric current. In the specific case such actuator reaches strokes of about 0.10 mm.

The top of the actuator 19 lifts a cap 21, abutting the lower surface of the lifting plate 20 in a single point of contact. In this way, there is a single point of contact between the plate and the cap, preventing any not perfectly vertical movements of the plate. Clearly, the desired braking level can be reached with precision only if such mechanical parts guarantee uniform action of the friction surfaces on the plate.

According to a further characteristic of the present invention, the device has a means for compensating for any clearance due to tolerances and processing uncertainties and consumption of the brake lining of the friction surfaces.

In fact, the production tolerances could lead to imperfect contact between the cap 21 and the lower surface of the lifting plate 20, with consequent loss of effectiveness of the action of the piezoelectric actuator, because of the reduced stroke thereof.

Furthermore, after braking a significant number of times, the braking surfaces can become worn and cause an increase in the stroke required of the actuator with respect to previous analogous braking. In that case it is necessary to make the actuator move slightly upwards so that it always maintains a position of the lifting plate and the friction surfaces brushing against the plate.

Such compensation means is positioned in proximity to the base of the container body 1 and of the actuator and comprises a rotating plate 21 moved by a relevant motor (not shown) and a disk 22 coupled between them. Such disk can move vertically abutting the base of the actuator with its flat upper surface. The upper surface of the plate and the lower surface of the disk are shaped so that when the plate rotates activated by the motor, the inclined surfaces of the plate and of the disk coming into contact with each other lift such disk upwards, in turn lifting the actuator upwards.

By controlling the activation of the motor, it is always possible to keep the friction surfaces 17 of the plate 16 at the same distance.

Preferably, the plate is provided on the upper surface with at least one cam 23 which is raised with respect to the surface of the plate and inclined with respect thereto. Even more preferably, the cams are both shaped like opposing annular sectors. Furthermore, such means on the lower surface of the disk 22 has a flat central part 24 that corresponds with a similarly flat central part 25 of the plate 20 positioned between the two cams. There are also two inclined annular sectors 26 on such disk that correspond to the two cams 23 of the plate.

The invention claimed is:

1. A braking device provided in a bench to check the correct operation of industrial screwdrivers, wherein the braking simulates a tightening operation of said screwdriver, the braking device comprising:
   a container body on the top of which a coupling protrudes, suitable for coupling with the head of the screwdriver to be tested, said coupling being connected, by means of a shaft, to a braking unit,
   an electronic torque and angle detector of the shaft rotation,
   said braking unit comprises a plate, rotated by the screwdriver, which is braked by suitable friction surfaces moved towards the plate by the movement of an actuator, characterized in that the movement of said actuator is realized by at least one electronically controlled piezoelectric element (17),
   wherein the actuator is placed below the plate and pushes upwards the friction surfaces (15) to the lower surface of said plate, while on the upper surface of the plate contrast surfaces (16) are provided, which cooperate with the friction ones to brake the plate,
   wherein the braking device further comprises means for compensating the clearance due to production tolerances and consumption of the lining of the friction surfaces, said means being positioned near the base of the container body (1) and including a rotating plate (20) having inclined surfaces on its upper surface moved into rotation driven by a suitable motor and a disk coupled with said rotating plate, said disk moving vertically and abutting with its flat upper surface on the base of the actuator, the up-per surface of said rotating plate and the lower surface of the disk being shaped in such a way that when said rotating plate is driven by the motor, said inclined surfaces of the plate and of said disc come into contact with each other and said disc is lift upwards, thus raising the actuator upwards into the direction of the friction surfaces.

2. The braking device according to claim 1, wherein the piezoelectric element is placed in a housing and expands itself when subjected to an electric current, thus lifting upwards a lifting plate which in turn pushes such friction surfaces, said plate moving along guides located on the inner surfaces of the container body.

3. The braking device according to claim 1, wherein the top of the actuator lifts a cap, abutting the lower surface of the lifting plate in a single point of contact.

4. The braking device according to claim 1, wherein the actuator comprises a plurality of piezoelectric elements placed one on the other, so as to increase the total stroke of the actuator, adding up the effects of each element.

5. The braking device according to claim 1, wherein the plate is provided, on the upper surface, with two cams shaped as annular sectors opposed each other.

6. The braking device according to claim 5, wherein said means on the lower surface of the disk have a flat central part corresponding to a similarly flat central part of the plate positioned between the two cams and the two inclined annular sectors corresponding with the two cams of the plate.

7. A bench for testing industrial screwdrivers comprising a plurality of braking devices according to claim 1, to which an industrial screwdriver can be associated, which are suitably controlled by a bench electronic control board, the electronic braking torque and angle detectors being controlled by said electronic board, determining the choice of a set braking program, once the operator has chosen the brake to be used for testing the screwdriver.

* * * * *